United States Patent
Keshavarzian et al.

(10) Patent No.: US 8,054,864 B2
(45) Date of Patent: Nov. 8, 2011

(54) METHOD FOR FAST SYNCHRONIZATION AND FREQUENCY HOP SEQUENCE DETECTION IN WIRELESS SENSOR NETWORKS

(75) Inventors: Abtin Keshavarzian, Palo Alto, CA (US); Arati Manjeshwar, Chandler, AZ (US)

(73) Assignee: Robert Bosch GmbH, Stuttgart (DE)

( * ) Notice: Subject to any disclaimer, the term of this patent is extended or adjusted under 35 U.S.C. 154(b) by 615 days.

(21) Appl. No.: 12/188,417

(22) Filed: Aug. 8, 2008

(65) Prior Publication Data

US 2010/0034239 A1 Feb. 11, 2010

(51) Int. Cl.
*H04B 1/00* (2006.01)
(52) U.S. Cl. ........ 375/130; 375/132; 375/354; 375/355; 375/356
(58) Field of Classification Search ............... 375/354, 375/355, 356, 130, 132
See application file for complete search history.

(56) References Cited

U.S. PATENT DOCUMENTS

| | | | | |
|---|---|---|---|---|
| 7,280,615 | B2 * | 10/2007 | Roberts ........................ | 375/316 |
| 7,778,151 | B2 * | 8/2010 | Bertrand et al. .............. | 370/208 |
| 2002/0080769 | A1 | 6/2002 | Spencer et al. | |

FOREIGN PATENT DOCUMENTS

WO WO02099993 A1 12/2002

OTHER PUBLICATIONS

Gang Lu et al: "Performance Evaluation of the IEEE 802.15.4 MAC for Low-Rate Low-Power Wireless Networks"; Performance, Computing, and Communications; 2004 IEEE International Conference on Phoenix, AZ, Apr. 15-17, 2004, Piscataway, NJ, USA, IEEE, Apr. 15, 2004, pp. 701-706 (5 pgs.); XP010770132, ISBN: 978-0-7803-8396-8. (The whole document).
FCC Regulations for ISM Band Devices: 902-928 MHz.
European Standard ETSI EN 300 220-1.

* cited by examiner

*Primary Examiner* — Ted Wang
(74) *Attorney, Agent, or Firm* — Taft Stettinius & Hollister LLP

(57) ABSTRACT

A method of synchronizing wireless devices includes establishing a recurring sequence of frequency channels at which the wireless devices are to communicate. The frequency channels are divided into a plurality of groups. Synchronization information is transmitted at a respective first frequency channel in each of the groups of frequency channels during a first sampling time period. One of the groups of frequency channels is selected. A wireless device is used to sample each of the frequency channels in the selected group during the first sampling time period. Non-synchronization information is transmitted after the first sampling time period. Synchronization information is transmitted at a next respective frequency channel in each of the groups of frequency channels during a next sampling time period. The next sampling time period occurs after the transmitting of the non-synchronization information.

20 Claims, 13 Drawing Sheets

Beacon slot length in ms

Out of 400ms allowed by regulation to use in any 20s window, how much remains for other network operations

METHOD FOR FAST SYNCHRONIZATION AND FREQUENCY HOP SEQUENCE DETECTION IN WIRELESS SENSOR NETWORKS

COPYRIGHT NOTICE

Portions of this document are subject to copyright protection. The copyright owner does not object to facsimile reproduction of the patent document as it is made available by the U.S. Patent and Trademark Office. However, the copyright owner reserves all copyrights in the software described herein and shown in the drawings. The following notice applies to the software described and illustrated herein: Copyright© 2007, Robert Bosch GmbH, All Rights Reserved.

BACKGROUND OF THE INVENTION

1. Field of the Invention

The present invention relates to frequency hopping wireless systems, and, more particularly, to synchronization of frequency hopping wireless systems.

2. Description of the Related Art

According to FCC regulations, any short-range wireless system that operates in frequency bands 902-928 MHz or 2400-2483.4 MHz should employ either frequency hopping methods or use digitally modulated techniques. Similar requirements are present in European standards (EN300-220) regarding the use of frequency band 863-870 MHz.

In the frequency hopping methods, the system divides the available frequency bandwidth into many frequency channels, and it continuously switches the channel, using a pseudorandom frequency hop sequence known to both the transmitter and the receiver. The FCC regulation for the 902 MHz band requires the system to use a minimum of fifty frequency channels. The nodes in the network follow a pseudorandom frequency hop pattern as the system switches between different frequency channels. The period during which the system stays in one frequency channel before hopping to the next channel is referred to as "dwell time". The FCC and EN300-220 regulations specify a maximum dwell time of 400 milliseconds. The dwell time can be fixed or it can change for different transmissions. However, each transmitter should, on average, use each channel in the frequency hop sequence equally. In addition, the FCC regulation specifies a maximum channel usage by the system: The average time of occupancy on any frequency channel should not be greater than 400 milliseconds within any window having a length of twenty seconds.

Although both the sender and the receiver (and in general all the nodes in the system) are assumed to know the frequency hop sequence, in order to have a successful communication they should also be in synchronization in the sense that they should both know which position in the frequency hop sequence is being used at any moment in time. The system should provide a mechanism for the newly added nodes, or existing nodes that have lost the time-synchronization, to get in synchronization with the rest of the network and find the current frequency hop index in the frequency hop sequence.

Synchronization latency is an important design factor. A newly added node should be able to get in synchronization with minimal delay to start the communication with the remainder of the network. The acceptable latencies for the synchronization process in many applications are on the order of one to two seconds.

On the other hand, it is desired to use as few transmissions as possible for the synchronization process. This is important because the regulation imposes a limit on the period of time that each channel can be used by the system (i.e., 400 milliseconds in any window of twenty seconds). The less transmission time that is used for the synchronization process, the more time remains for other network operations.

What is neither disclosed nor suggested by the prior art is a synchronization method that enables fast synchronization while, on average, the transmission time on each channel is reduced.

SUMMARY OF THE INVENTION

The present invention addresses the synchronization problem in frequency hopping systems. Particularly, the invention provides a solution for synchronizing, in a time-efficient manner, a newly added node or an existing node that has lost time-synchronization with the rest of the network.

The invention comprises, in one form thereof, a method of synchronizing wireless devices, including establishing a recurring sequence of frequency channels at which the wireless devices are to communicate. The frequency channels are divided into a plurality of groups. Synchronization information is transmitted at a respective first frequency channel in each of the groups of frequency channels during a first sampling time period. One of the groups of frequency channels is selected. A wireless device is used to sample each of the frequency channels in the selected group during the first sampling time period. Non-synchronization information is transmitted after the first sampling time period. Synchronization information is transmitted at a next respective frequency channel in each of the groups of frequency channels during a next sampling time period. The next sampling time period occurs after the transmitting of the non-synchronization information.

The invention comprises, in another form thereof, a method of synchronizing wireless devices, including establishing a recurring sequence of frequency channels at which the wireless devices are to communicate. The frequency channels are divided into a plurality of groups. Synchronization information is transmitted at a respective first frequency channel in each of the groups of frequency channels during a first sampling time period. A wireless device is used to select one of the groups of frequency channels. The wireless device is used to sample each of the frequency channels in the selected group for the synchronization information. The sampling occurs during the first sampling time period. Non-synchronization information is transmitted after the first sampling time period. Synchronization information is transmitted at a next respective frequency channel in each of the groups of frequency channels during a next sampling time period. The next sampling time period occurs after the transmitting of the non-synchronization information. Non-synchronization information is transmitted after the next sampling period. The steps of transmitting synchronization information at a next respective frequency channel and transmitting the non-synchronization information are repeated until synchronization information has been transmitted in each frequency channel in each of the groups of frequency channels.

The invention comprises, in yet another form thereof, a method of synchronizing wireless devices, including informing each of the wireless devices of a frequency channel hop sequence at which non-synchronization information is to be transmitted. Synchronization information is sequentially transmitted to each of a plurality of frequency channels in a first subset of the frequency channels included in the hop sequence. A wireless device is used to sample each of the frequency channels in a second subset of the frequency channels. The second subset includes one frequency channel included in the first subset and at least one frequency channel omitted from the first subset. Non-synchronization information is transmitted after the sampling of the frequency channels in the second subset. Synchronization information is sequentially transmitted to each of a plurality of frequency channels in a third subset of the frequency channels. The third subset includes one of the frequency channels in the second subset and none of the frequency channels in the first subset.

An advantage of the present invention is that both the synchronization latency and the transmission time on each frequency channel are reduced.

Another advantage is that the present invention complies with all known government regulations for frequency channel usage.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
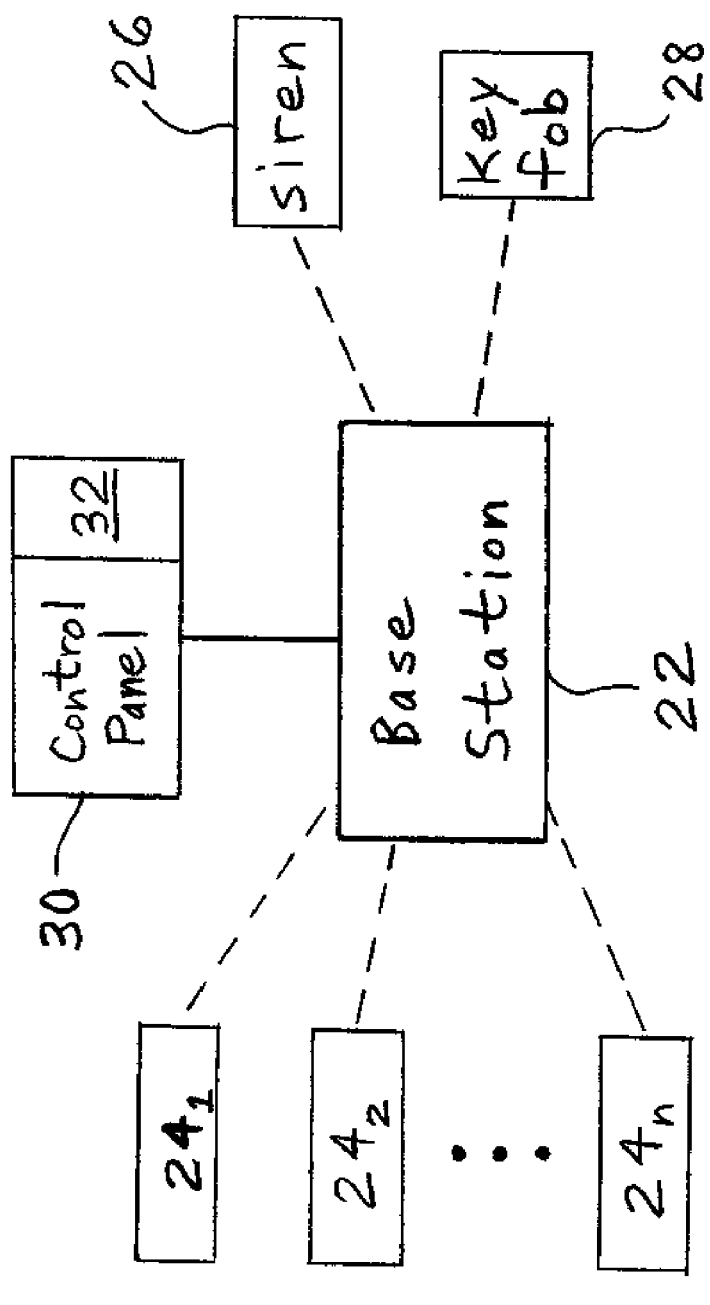
FIG. 1 is a block diagram of one embodiment of a wireless system suitable for use with the synchronization method of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

The present invention may be described herein in terms of algorithms and operations on data bits within a computer. It has proven convenient, primarily for reasons of common usage among those skilled in the art, to describe the invention in terms of algorithms and operations on data bits. It is to be understood, however, that these and similar terms are to be associated with appropriate physical elements, and are merely convenient labels applied to these physical elements. Unless otherwise stated herein, or apparent from the description, terms such as "calculating", "determining", "processing" or "computing", or similar terms, refer the actions of a computing device that may perform these actions automatically, i.e., without human intervention, after being programmed to do so.

Referring now to the drawings and particularly to FIG. 1, there is shown one embodiment of a wireless network 20 suitable for use in conjunction with the synchronization method of the present invention. Network 20 includes a base station, i.e., hub 22, a plurality of sensors $24_1, 24_2, \ldots, 24_n$, a siren 26, a key fob 28 and a control panel 30 that may include a keypad 32. Control panel 30 may be hard wired to hub 22, while sensors $24_{1\text{-}n}$, siren 26 and key fob 28 are in wireless communication with hub 22, as indicated by the dashed lines in FIG. 1.

Base station 22 and control panel 30 may be powered by household alternating current, and sensors $24_1, 24_2, \ldots, 24_n$, siren 26 and key fob 28 may be battery powered. For sensors $24_1, 24_2, \ldots, 24_n$, siren 26 and key fob 28, base station 22 is the gateway to control panel 30, which the user can use to interact with the system. In one embodiment, network 20 is in the form of a wireless Local Security Network (wLSN) system which is a wireless intrusion and alarm system.

Figure 2:
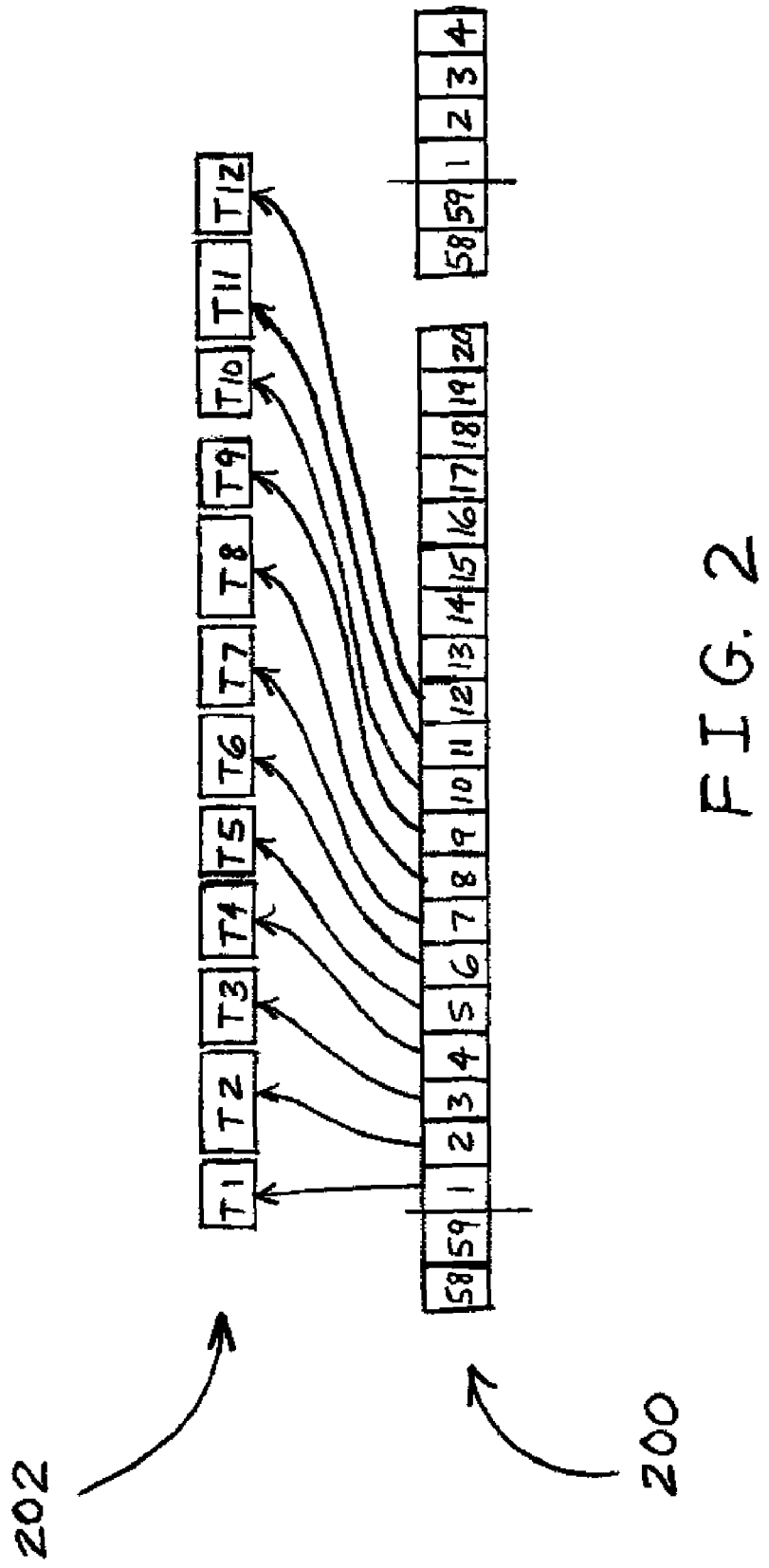
FIG. 2 is a timing diagram illustrating a typical frequency hop sequence and associated transmission times employed by the wireless system of FIG. 1.

The network uses a frequency hop pattern. After each transmission, the network hops to the next channel in the hop sequence. FIG. 2 illustrates a frequency hop pattern or sequence 200 and associated transmission times 202. In the particular embodiment illustrated in FIG. 2, the hop sequence uses fifty-nine frequency channels. Note that, as is shown in FIG. 2, the transmission time or "dwell time" (i.e., the period during which the system stays on one channel before moving to the next channel) can be different across different transmissions. However, it may be advantageous for each channel to be used for an equal amount of time, on average, in order to avoid any channel being used for more than 400 milliseconds within any 20 second window.

Figure 3:
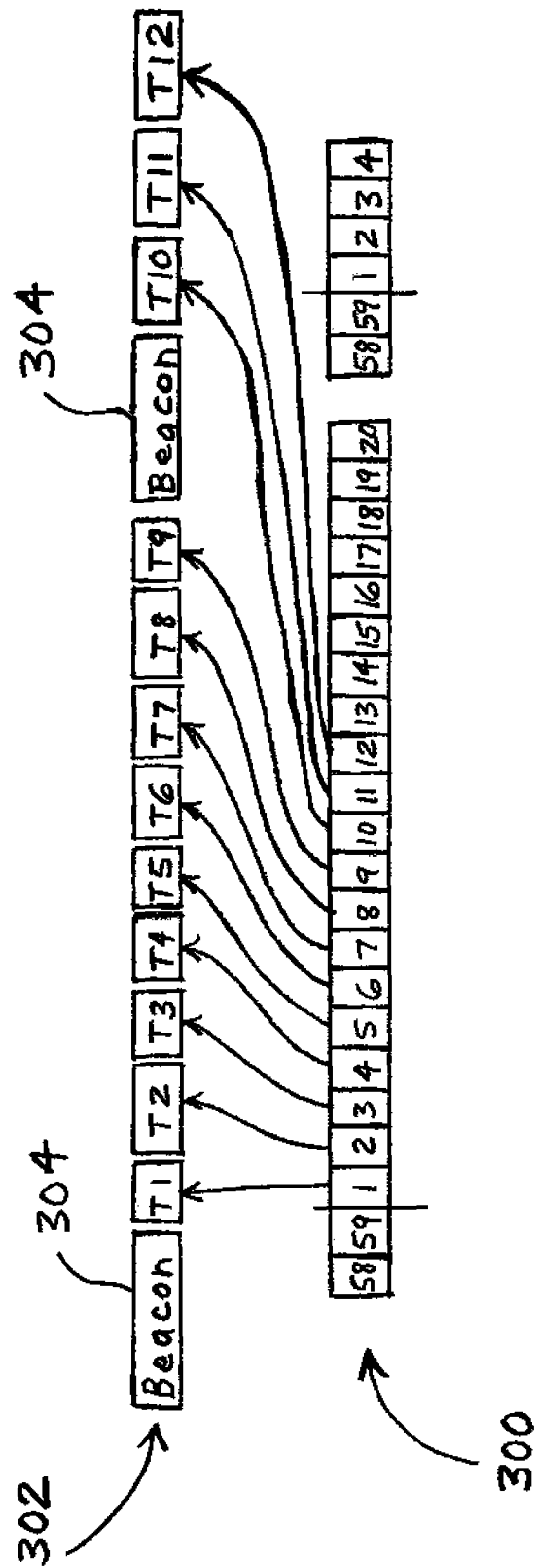
FIG. 3 is a timing diagram illustrating a frequency hop sequence and associated transmission times according to one embodiment of a synchronization method of the present invention.

FIG. 3 illustrates a frequency hop pattern or sequence 300 and associated transmission times 302 according to another embodiment. In the embodiment of FIG. 3, base station 22 may be used to wirelessly and periodically transmit "beacons" 304 (i.e., announcement messages) to inform all of the newly added nodes (or, more generally, nodes that need to get synchronized with the network) of the frequency hop sequence and the current hop position.

In each "beacon slot" many announcement messages or "announcement packets" may be transmitted. The announcement packets may contain information about the hop pattern and the current frequency hop index. For example, the announcement packets may contain the seed value of the random number generator which is used for creating the pseudorandom frequency hop pattern.

The beacon transmissions need to comply with the government regulations, and therefore it may be advantageous for the beacon transmissions to be sent to all frequency channels used by the system. Thus, the beacons are generally not transmitted to only one fixed frequency channel or only one sub group of channels. It may be advantageous for the announcement packets (beacons) to themselves follow a frequency hop sequence and use each frequency channel equally. The beacon hop sequence can be the same as or different from the main frequency hop pattern used in the network. However, it is possible, according to the invention, for the beacon hop sequence to be different from the main frequency hop pattern used in the network in order to improve the synchronization latency.

Figure 4:
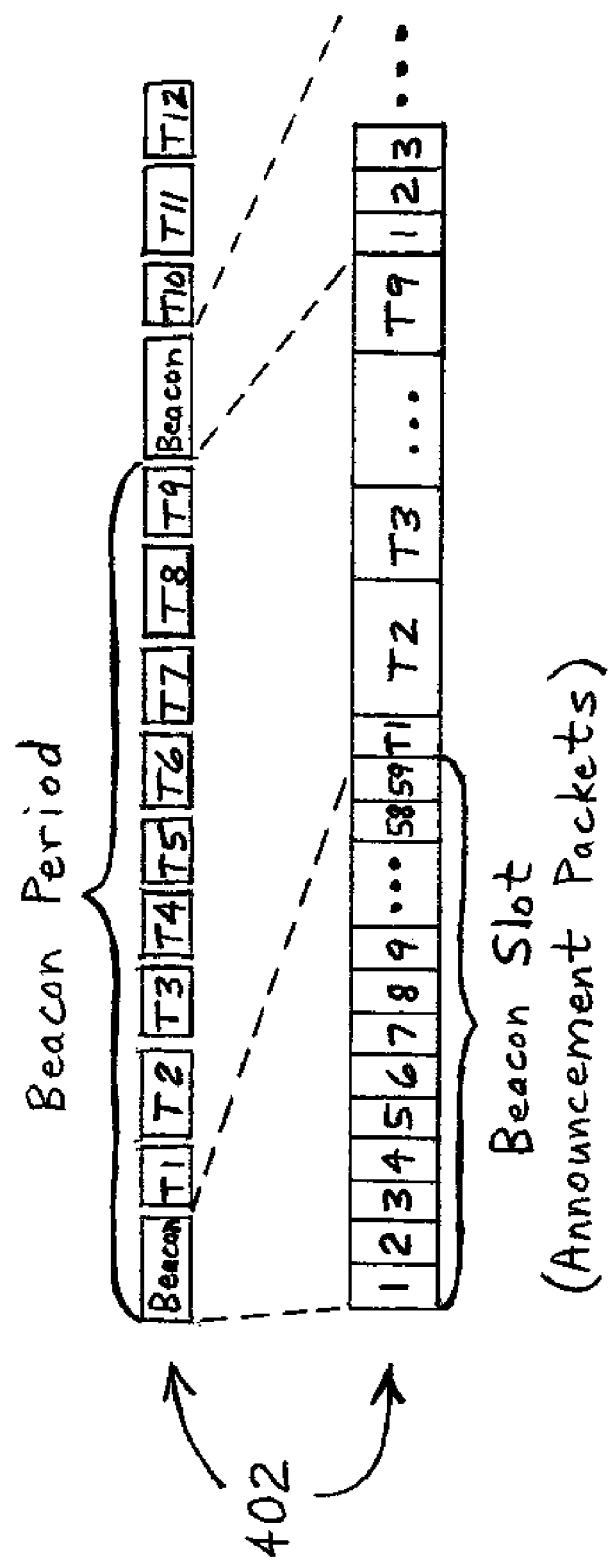
FIG. 4 is a timing diagram illustrating transmission times with an expanded illustration of the beacon slot according to another embodiment of a synchronization method of the present invention.

The upper portion of FIG. 4 illustrates transmission times 402 associated with a frequency hop pattern in another embodiment. The lower portion of FIG. 4 illustrates transmission times 402 including an expanded illustration of the beacon slot. During each beacon slot, announcement packets are sent in all the frequency channels. Particularly, identical announcement packets may be sequentially sent to each of the fifty-nine frequency channels. A node that needs to get synchronized with the network may select one of the frequency channels randomly and listen to the channel for the announcement (beacon) message. Eventually, within the time duration of the beacon slot, an announcement packet is transmitted to the particular frequency channel that the node has selected and is listening to. Thus, the node receives the announcement message within the time duration of the beacon slot regardless of which of the frequency channels that the node selects.

The synchronization latency may be determined by how often the system sends the beacons, i.e., the time period between time-adjacent transmissions of the beacon slots. This time period is labeled in FIG. 4 as the "beacon period." In the worst case, the delay, or amount of time, required to achieve synchronization may be equal to one beacon period. On average, the delay, or amount of time required to achieve synchronization may be equal to one-half of a beacon period.

A problem with the embodiment depicted in FIG. 4 is that many packets are transmitted within each beacon slot, which not only wastes the network time, but also uses the frequency channels inefficiently. Because of the inefficient use of the frequency channels, the amount of time remaining (out of the 400 milliseconds permitted by the government regulations to use each channel during a twenty second period) for other network operations becomes limited.

Figure 5:
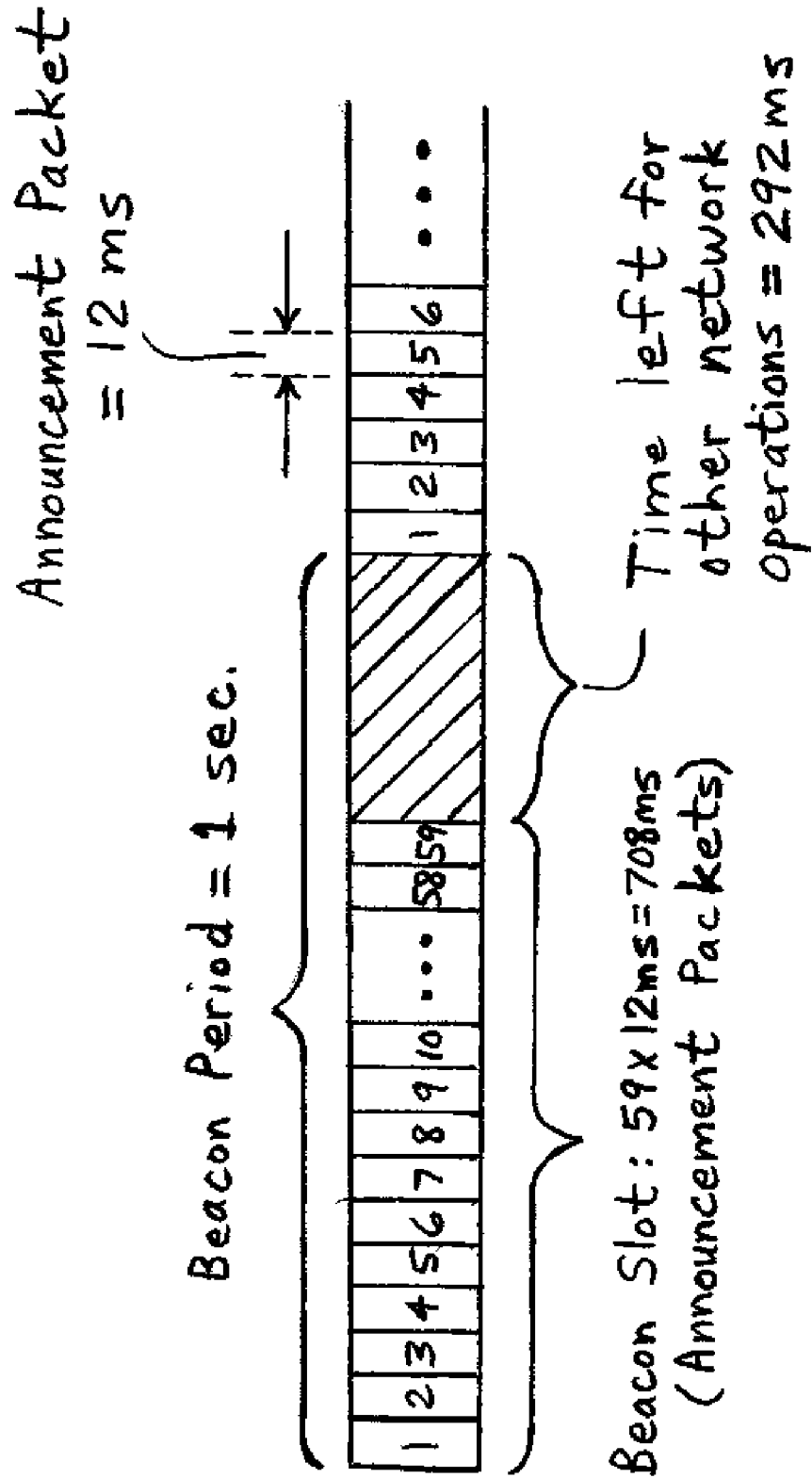
FIG. 5 is a timing diagram illustrating the breakdown between synchronization time and time for other network activities within the transmission times in the embodiment of FIG. 4.

FIG. 5 is a timing diagram illustrating the breakdown between synchronization time and time for other network activities within the transmission times in the embodiment of FIG. 4, making some practical assumptions regarding the length of the announcement packet and the transmission times. In order to achieve a worst-case delay of one second for synchronization, the beacon transmission period may be no longer than one second. It may be assumed that within each announcement packet there are five bytes of data; seven bytes of overhead for the preamble, the start byte, and the switching of frequency channels; and two bytes for a cyclic redundancy check (CRC). These assumptions result in an overall announcement packet length of fourteen bytes. Assuming a data transmission rate of 9600 bits per second (which is typical for the radio used at the 900 MHz band), the transmission of a single announcement data packet to a single frequency channel requires twelve milliseconds.

With the assumption of fifty-nine different frequency channels being used, the transmission of a beacon slot may require fifty-nine data packet transmissions at twelve milliseconds per transmission, i.e., 708 milliseconds. The beacon slot may be transmitted once per second in order to achieve a worst-case delay of one second for synchronization. Thus, on average, in each one second time period, 708 milliseconds (70.8% of the time) is occupied by beacon slot transmissions for synchronization, and the remaining 292 milliseconds (29.2% of the time) is available for other network activities, as is illustrated in FIG. 5. Immediately after the end of the one complete beacon period shown in FIG. 5, the next one-second beacon period, and the next beacon slot within the one-second beacon period, may begin.

Another factor that may be considered in view of the government regulations is the amount of time that may be used for synchronization within each individual frequency channel. The regulations specify that within any window of twenty seconds duration, each channel may be used (for any purpose, including synchronization and/or other network operations) for a maximum of 400 milliseconds. The transmission of announcement packets occupies each channel for twelve milliseconds in each one-second period, and so, in a twenty second period, each channel is used for 240 milliseconds (12 milliseconds/second×20 seconds) by the beacon slots for the transmission of announcement packets. This leaves only 160 milliseconds (400 milliseconds–240 milliseconds) for other network activities.

Another embodiment of a synchronization method of the present invention, as described below, has the advantages of achieving synchronization in less time and using the frequency channels more efficiently. In this embodiment, the frequency channels are grouped, and longer but fewer announcement packets are transmitted. This may have the effect of reducing the transmission time of beacons and reducing the frequency channel usage.

In this embodiment of a method for transmitting the beacons, the frequency channels are divided into groups. In the specific embodiment to be next described, the frequency channels are divided into groups of two for ease of illustration herein. After the simple case of groupings of two frequency channels is described, the generalized case of arbitrary groupings of arbitrary size will be described herein.

As mentioned above, all of the frequency channels (in this case, fifty-nine frequency channels) utilized by the network may be divided into groups of size two as follows:

{1, 2}, {3, 4}, {5, 6}, ..., {57, 58}, {59}.

A node that needs to be synchronized with the network randomly selects one of the groups of two frequency channels. Then the node may repetitively sample each of the two frequency channels of the selected group back-to-back until the node senses a high signal on one of the channels. The node then waits to receive a packet on the channel on which the node sensed the high signal. For example, if the node picks group {1,2}, then the receiver node repetitively samples frequency channel 1 and frequency channel 2 as shown in FIG. 6.

Because the receiving node is sampling both channel 1 and channel 2, the base station does not need to send announcement packets in both channels in order for the node to receive the announcement packet. In each beacon slot, the base station transmits to one channel or the other in each group of two frequency channels. In a particular embodiment, in each beacon slot, the base station transmits in either the even-numbered channels or the odd-numbered channels.

Figure 6:
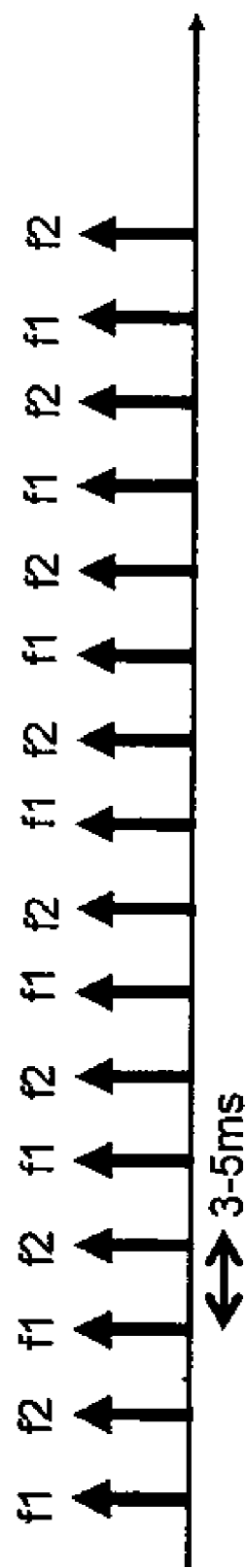
FIG. 6 is a timing diagram illustrating sampling of frequency channels in yet another embodiment of a synchronization method of the present invention.
Figure 7:
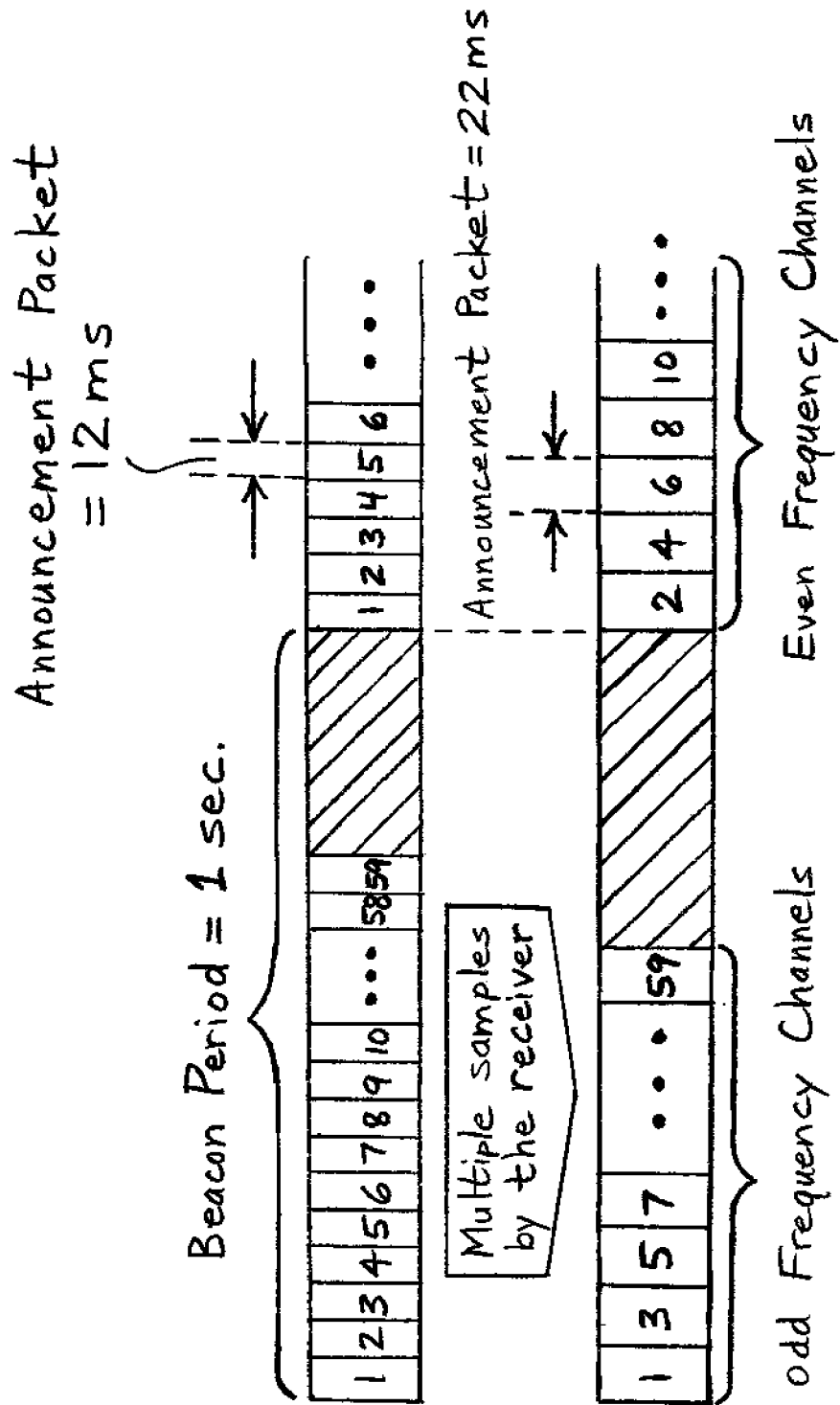
FIG. 7 is a comparison of the timing diagrams illustrating the breakdown between synchronization time and time for other network activities in the embodiments of FIGS. 5 and 6.

FIG. 7 is a comparison of the timing diagrams illustrating the breakdown between synchronization time and time for other network activities in the embodiments of FIGS. 6 and 7. In the lower of the two embodiments illustrated in FIG. 7 (corresponding to the embodiment of FIG. 6), the base station transmits announcement packets to odd-numbered frequency channels in a first beacon slot, and to even-numbered frequency channels in a second beacon slot. This pattern may be repeated throughout the operation of the network, with the base station alternating between transmitting to odd-numbered frequency channels and transmitting to even-numbered frequency channels.

With the embodiment illustrated in FIG. 6 and in the lower portion of FIG. 7, the number of announcement packets transmitted in each beacon slot may be reduced. However, because the receiving node is sampling two different frequencies, a step is taken to ensure that the receiving node does not miss receiving an announcement packet. Namely, the announcement packet is made to be of longer duration.

Figure 8:
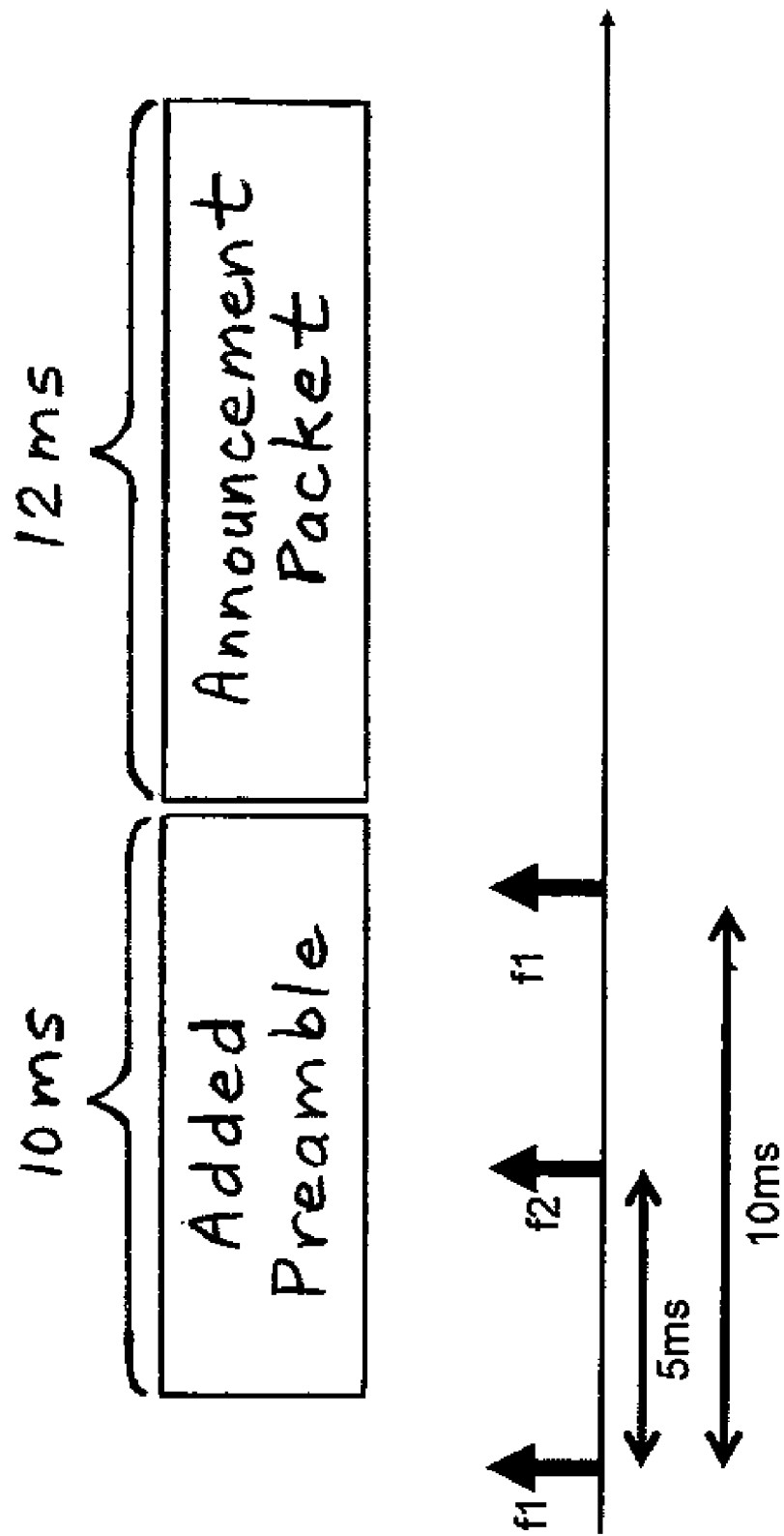
FIG. 8 is a timing diagram comparing the sampling of frequency channels to an announcement packet and its preamble in the embodiment of FIGS. 6 and 7.

The amount of time needed by the radio to switch to a new channel and sample the signal level may be about three to five milliseconds, as illustrated in FIG. 6. The worst-case of five milliseconds may be assumed herein. The packet transmission time of an announcement packet may be increased by including a longer preamble in the transmission. In order to increase the probability that an announcement packet will be received by the receiving node, the duration of the packet transmission may be set to be equal to or greater than the length of time between two samples of a same frequency channel. As illustrated in FIG. 8, the length of time between two samples of frequency channel f1 is 10 milliseconds. Thus, an Added Preamble is provided having a same time length of 10 milliseconds. Because a sample of each frequency channel coincides with the Added Preamble, the receiving node is unlikely to miss the reception of an announcement packet. In one embodiment, a preamble is added to the synchronization information wherein a time duration of the preamble is approximately equal to an amount of time needed to sample each of the frequency channels in the selected group.

Figure 9:
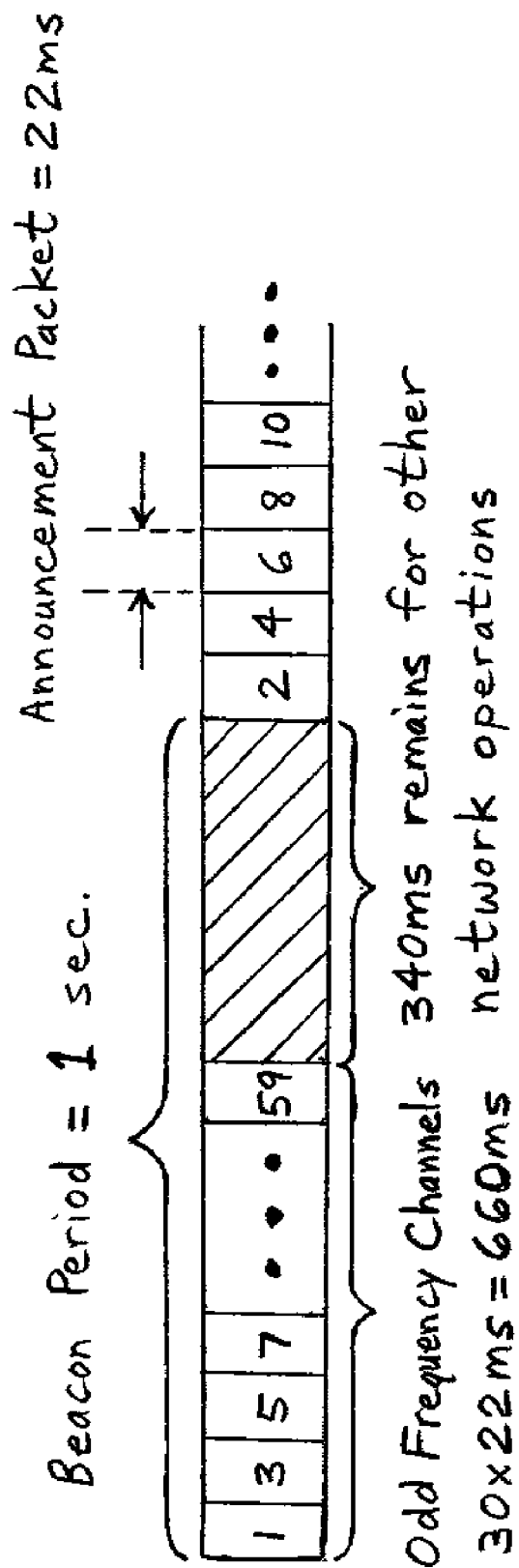
FIG. 9 is a timing diagram illustrating the breakdown between synchronization time and time for other network activities in the embodiments of FIGS. 6-8.

In the embodiment illustrated in FIG. 8, the length of time needed to transmit an announcement packet is 22 milliseconds (10 milliseconds+12 milliseconds). However, as shown in the lower half of FIG. 7, thirty announcement packets are transmitted within each beacon slot, rather than fifty-nine, as in the embodiment of FIG. 5. Thus, the overall length of the beacon slot is only 660 milliseconds (30×22 milliseconds), as shown in FIG. 9, rather than the 708 millisecond overall length of the beacon slot in the embodiment of FIG. 5. Further, only 66% of the one second beacon period is used for beacons and synchronization, and 34% of the one second beacon period remains and is available for other network activities.

As shown in FIG. 9, each frequency channel is used for twenty-two milliseconds during each two second period for transmission of beacons. Thus, in each window of twenty seconds, each frequency channel is used for 220 milliseconds, which leaves 180 milliseconds (400 milliseconds−220 milliseconds) per frequency channel for other network operations.

In general, according to an embodiment of the present invention, the frequency channels may be divided into groups of size n. The receiving node may select one of the groups randomly and sample all of the n channels back-to-back. As the number of frequency channels in a group increases, the length of time needed by a node to sample all of the frequency channels in the group increases accordingly. Thus, the Added Preamble may be correspondingly lengthened to match the increased length of time between samples of a same frequency channel by a single node.

In order to select advantageous values for n, two parameters may be considered:
1) The duration of time spent in transmitting the beacons in each one second window (and the remaining time left over for network operations); and
2) The amount of time remaining within each frequency channel for other network operations within a window of twenty seconds.

Figure 10A:
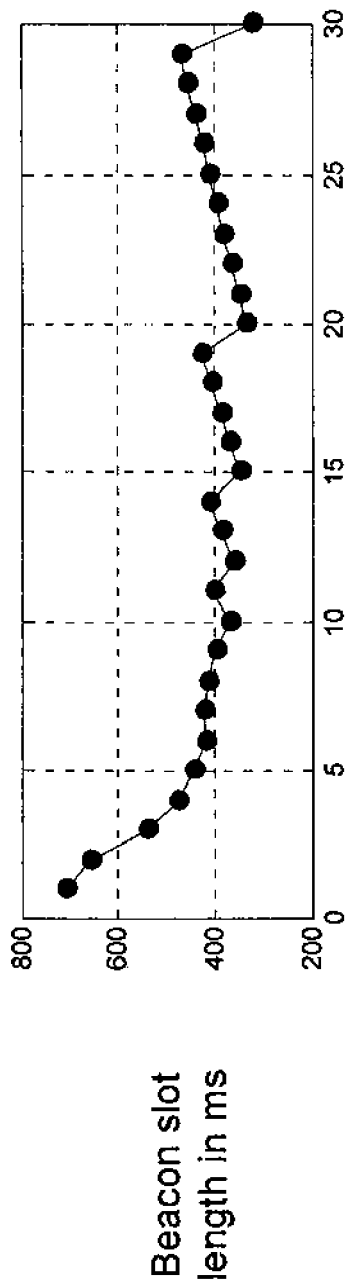
FIG. 10*a* is a plot of beacon slot length versus group size according to the synchronization method of the present invention.
Figure 10B:
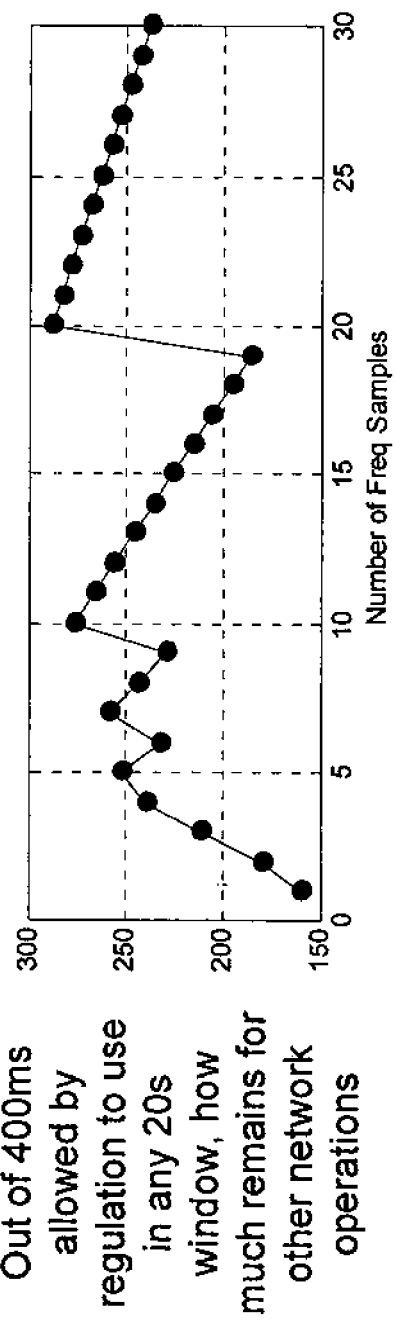
FIG. 10*b* is a plot of time available for other network functions per twenty second window versus group size according to the synchronization method of the present invention.

It may be advantageous to reduce the first parameter (time spent transmitting beacons), while increasing the second parameter (time left within each frequency channel for other network operations). FIG. 10a is a plot of the first parameter above versus the number of frequency channels included in each group. Similarly, FIG. 10b is a plot of the second parameter above versus the number of frequency channels included in each group. For each of the plots of FIGS. 10a and 10b, it is assumed that the announcement packet length is twelve milliseconds, and that the time between two adjacent samples is five milliseconds.

As may be seen in the plots of FIGS. 10a and 10b, n=20 or n=10 are good options for the group size, both having a favorable combination of a relatively low beacon slot length and a relatively large amount of time available for other network operations. For example, in the case of n=20, the channels are divided into three groups of size twenty each:
Group 1={1, 2, 3, 4, 5, 6, . . . , 20}
Group 2={21, 22, 23, 24, . . . , 40}
Group 3={41, 42, 43, 44, . . . , 59}

Figure 11:
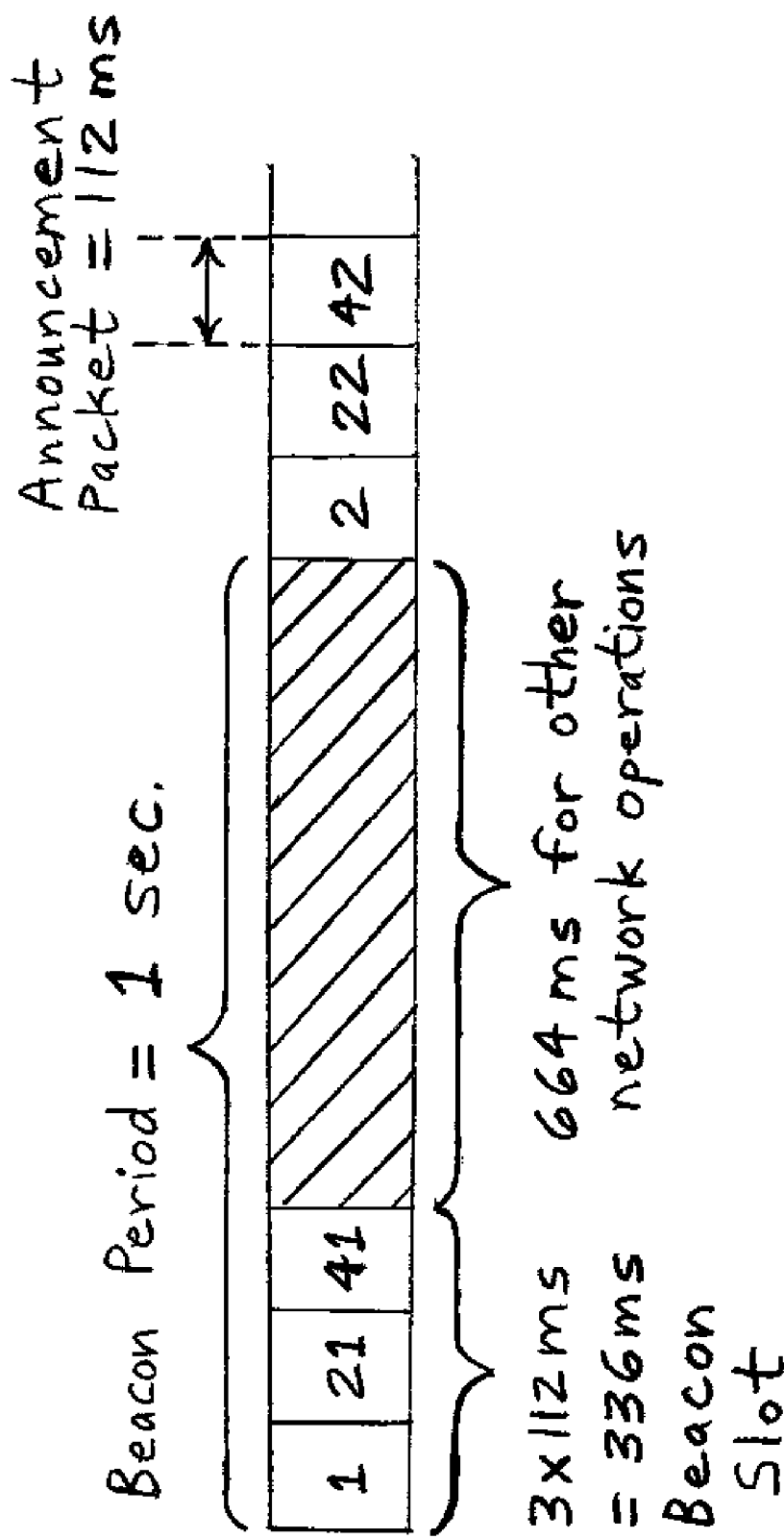
FIG. 11 is a timing diagram illustrating the breakdown between synchronization time and time for other network activities according to a further embodiment of a synchronization method of the present invention.

In each beacon slot, the base station sends three 112 millisecond long announcement packets (100 millisecond preamble and 12 millisecond packet). Thus, the beacon slots are 336 milliseconds long (3×112 milliseconds), leaving 664 milliseconds available for other network operations, as illustrated in FIG. 11. That is, with twenty frequency channels in each group, an average of 33.6% of time is used for beacons and synchronization and 66.4% remains for other network activities. Because the 664 milliseconds exceeds a 400 millisecond maximum dwell time that may be mandated by government regulations, more than one frequency channel may be employed during the 664 millisecond period. Also, out of the 400 milliseconds that each frequency channel may be in use during any twenty second period, 288 milliseconds (400 milliseconds−112 milliseconds) are available for other network operations.

Figure 12:
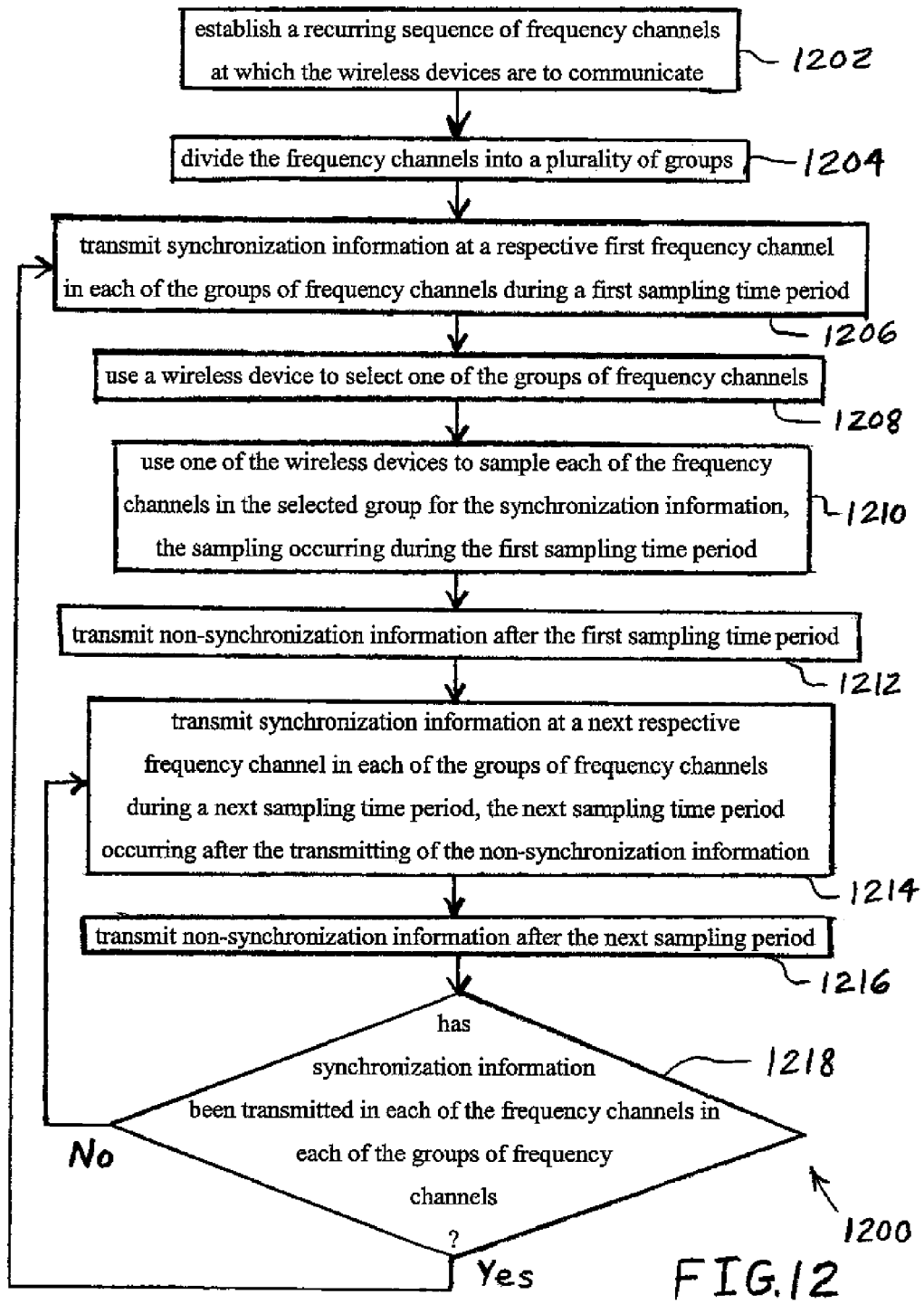
FIG. 12 is a flow chart illustrating one embodiment of a synchronization method of the present invention.

FIG. 12 illustrates one embodiment of a method 1200 of the present invention for synchronizing wireless devices. In a first step 1202, a recurring sequence of frequency channels at which the wireless devices are to communicate is established. That is, as mandated by government regulations, wireless devices may need to divide their communication time among various frequency channels according to a "frequency hop pattern" or "frequency hop sequence." The frequency hop sequence may specify a sequence of frequency channels to which each of the wireless devices is to "hop" at certain times such that each of the wireless devices may communicate at the same frequency channels at the same times. After the designated time at the final frequency channel in the frequency hop sequence is completed, the sequence may recur by each wireless device returning their communications to the initial frequency channel in the sequence. The frequency hop sequence may be programmed into each wireless device at the factory where and when the wireless device is manufactured.

Else, or in addition, an installer may program the frequency hop sequence into a wireless device at the point in time at which the wireless device is being installed in the network.

In a next step 1204, the frequency channels are divided into a plurality of groups. For example, in the embodiment of FIG. 11 the fifty-nine frequency channels included in the frequency hop sequence are divided into three groups, with frequency channels 1-20 being in a first group, channels 21-40 being in a second group, and channels 41-59 being in a third group.

In step 1206, synchronization information is transmitted at a respective first frequency channel in each of the groups of frequency channels during a first sampling time period. Synchronization information may include time periods and specific frequency channels associated with transmission of non-synchronization information. That is, synchronization information may include a schedule of frequency channels and times at which non-synchronization information is transmitted. It is also possible, within the scope of the invention, for synchronization information to include a schedule of frequency channels and times at which synchronization information is transmitted. In the embodiment illustrated in FIG. 11, synchronization information is transmitted at first frequency channels 1, 21 and 41 in each of the first, second and third groups of frequency channels, respectively, during a sampling time period represented by the 336 millisecond long beacon slot. Although a "first" frequency channel is referred to in step 1206 and in other instances herein, it is to be understood that "first" does not imply that the "first frequency channel" is necessarily the channel of the lowest frequency in the group. Rather, "first frequency channel" may merely imply that the frequency channel is the first frequency channel at which synchronization information is transmitted in the group of frequency channels. Further, the sequential order of the frequency channels to which synchronization information is transmitted may be independent of the numeric values or magnitudes of the frequency channels in the group. That is, it is possible for the synchronization information to be transmitted to higher and lower frequency channels in a random or pseudo-random sequential order. Similarly, a "second" or "next" frequency channel as used herein does not imply that the frequency channel is necessarily of the second lowest or next lowest frequency value in the group. Rather, these terms may merely imply that the frequency channel is the group's second or next frequency channel in the sequential order of the frequency channels to which synchronization information is transmitted.

In a next step 1208, a wireless device is used to select one of the groups of frequency channels. For example, in the embodiment of FIG. 11, a newly added wireless device, such as one of sensors 24 (FIG. 1), siren 26 or key fob 28, may arbitrarily and/or randomly select one of the first, second and third groups corresponding to frequency channels 1-20, 21-40 and 41-59, respectively. It is possible, within the scope of the invention, for the wireless device to be pre-programmed with which of the groups of frequency channels it is to select in step 1208. Moreover, the groupings of the frequency channels, i.e., which frequency channels are in which groups, may also be pre-programmed into the wireless devices at the factory or by an installer so that the wireless device enters the wireless network with this information.

Next, in step 1210, one of the wireless devices is used to sample each of the frequency channels in the selected group for the synchronization information, the sampling occurring during the first sampling time period. In the embodiment of FIG. 11, assume that a wireless device has selected the first group of frequency channels including frequency channels 1-20. The wireless device would then sample, i.e., tune itself to receive radio frequencies in, each of frequency channels 1-20 during the initial 112 milliseconds of the beacon slot, i.e., of the sampling time period. Particularly, in the initial 5.6 milliseconds of the beacon slot, the wireless device may sample frequency channel 1, in which base station 22 transmits synchronization information, as in step 1206. The wireless device may recognize a high signal on frequency channel 1 and then receive the synchronization information on frequency channel 1. It is possible for the wireless device, having received the synchronization information, to discontinue sampling of the remainder of the frequency channels in the selected group. Assume now that, instead of the wireless device selecting the first group of frequency channels, the wireless device selects the third group of frequency channels including frequency channels 41-59. The wireless device would then sample, i.e., tune itself to receive radio frequencies in, each of frequency channels 41-59 during the initial 112 milliseconds of the beacon slot in which synchronization information is transmitted in only frequency channel 1. Next, the wireless device would also sample each of frequency channels 41-59 during the second 112 millisecond period of the beacon slot in which synchronization information is transmitted in only frequency channel 21. Finally, in the third 112 millisecond period of the beacon slot, the wireless device continues to sample frequency channels 41-59, and base station 22 transmits synchronization information in only frequency channel 41. Thus, sometime in the third 112 millisecond period of the beacon slot, the wireless device samples frequency channel 41 and receives the synchronization information. Although the wireless device may sample all of the frequency channels in a selected group, the frequency channels are not necessarily sampled in numerical order. For example, if a wireless device selects the group including frequency channels 1-20, the wireless device may sample the frequency channels in a frequency hop sequence in the form of a reverse numerical order, or in any other random or arbitrary order.

In step 1212, non-synchronization information, i.e., information other than synchronization information, is transmitted after the first sampling time period. In the embodiment of FIG. 11, for example, non-synchronization information is transmitted after the beacon slot and during the 664 millisecond period for other network operations.

Next, in step 1214, synchronization information is transmitted at a next respective frequency channel in each of the groups of frequency channels during a next sampling time period, the next sampling time period occurring after the transmitting of the non-synchronization information. In the embodiment illustrated in FIG. 11, synchronization information is transmitted at next frequency channels 2, 22 and 42 in each of the first, second and third groups of frequency channels, respectively, during a next sampling time period immediately after the transmitting of the non-synchronization information in the 664 millisecond long period for other network operations.

In a next step 1216, non-synchronization information is transmitted after the next sampling period. In the embodiment of FIG. 11, although not shown in FIG. 11 itself, non-synchronization information may be transmitted after the second beacon slot in which synchronization information is transmitted in frequency channels 2, 22 and 42.

In step 1218, it is determined whether synchronization information has been transmitted in each of the frequency channels in each of the groups of frequency channels. In the embodiment of FIG. 11, it is determined whether synchronization information has been transmitted in each of the frequency channels 1-59. If so, operation returns to step 1206 at the beginning of the ordered frequency channels wherein synchronization information is transmitted first to frequency channel 1, then to channel 21, etc. This second round through all of the frequency channels may be completed, and third and further rounds may also be undertaken and iterated indefinitely as needed. In the second and subsequent rounds, another wireless device may be used to select an other group of frequency channels to sample for synchronization information. If, in step 1218, it is determined that synchronization information has not been transmitted in each of the frequency channels in each of the groups of frequency channels then operation returns to step 1214 wherein synchronization information is transmitted at a next respective frequency channel in each of the groups of frequency channels. Continuing the example of FIG. 11 wherein synchronization information was last transmitted in frequency channels 2, 22 and 42, synchronization information may be transmitted to next frequency channels 3, 23 and 43 when operation returns to step 1214 from step 1218.

The description of step 1218 above includes references of rounds of synchronization information transmission through all of the frequency channels. It is to be understood that the present invention does not place any restrictions either on the number of wireless devices that may sample the frequency channels for synchronization information or on the times at which the wireless devices may do the sampling. For example, any number of wireless devices may simultaneously sample the same or different frequency channels. In general, the transmission of synchronization information and non-synchronization information by the hub may be unaffected by the sampling the transmissions by any number of wireless devices at any times.

Figure 13:
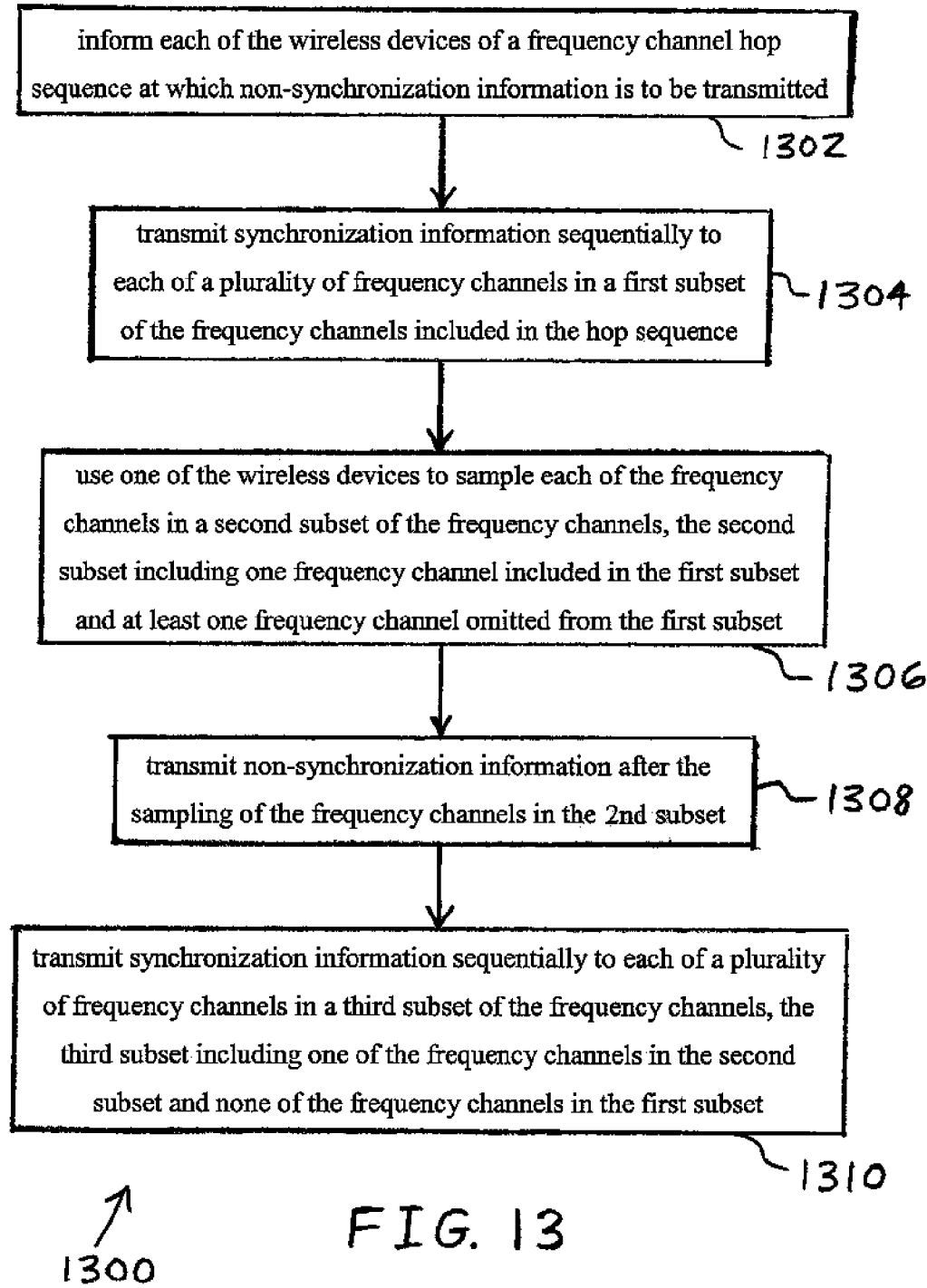
FIG. 13 is a flow chart illustrating another embodiment of a synchronization method of the present invention.

FIG. 13 illustrates another embodiment of a method 1300 of the present invention for synchronizing wireless devices. In a first step 1302, each of one or more wireless devices is informed of a frequency channel hop sequence at which non-synchronous information is to be transmitted. For example, one or more of wireless devices such as sensors 24, siren 26 and key fob 28 may be pre-programmed with a list of frequency channels and the time duration for which non-synchronous information is to be transmitted to each of the frequency channels. The time duration, or "dwell time," may be the length of time that non-synchronous information is to be transmitted to a given frequency channel before the transmission switches to the next channel in the sequence. That is, each of the wireless devices may be informed of the recurring sequence of frequency channels at which the wireless devices are to communicate. The frequency channel hop sequence may be pre-programmed into the wireless devices at the factory or may be programmed into the wireless devices by an installer.

In a next step 1304, synchronization information is sequentially transmitted to each of a plurality of frequency channels in a first subset of the frequency channels included in the hop sequence. For example, in the embodiment of FIG. 11, synchronization information may be sequentially transmitted to each of frequency channels 1, 21 and 41, which conjunctively form a first subset of the frequency channels.

In step 1306, one of the wireless devices may be used to sample each of the frequency channels in a second subset of the frequency channels, the second subset including one frequency channel included in the first subset and at least one frequency channel omitted from the first subset. In the embodiment of FIG. 11, a wireless device may sample each of frequency channels 1-20 that conjunctively form a second subset of the frequency channels. The second subset comprised of channels 1-20 includes one frequency channel, i.e., channel 1, included in the first subset comprised of channels 1, 21 and 41. The second subset comprised of channels 1-20 includes frequency channels, i.e., channels 2-20, that were omitted from the first subset comprised of channels 1, 21 and 41.

Next, in step 1308, non-synchronization information is transmitted after the sampling of the frequency channels in the second subset. In the embodiment of FIG. 11, non-synchronization information is transmitted during the 664 millisecond long period for other network operations and after the sampling of the frequency channels in the second subset that is comprised of channels 1-20.

In a final step 1310, synchronization information is sequentially transmitted to each of a plurality of frequency channels in a third subset of the frequency channels. The third subset includes one of the frequency channels in the second subset and none of the frequency channels in the first subset. In the embodiment of FIG. 11, synchronization information may be sequentially transmitted to each of frequency channels 2, 22 and 42, which conjunctively form a third subset of the frequency channels. The third subset includes one of the frequency channels in the second subset, i.e., channel 2, and none of the frequency channels 1, 21, 41 that comprise the first subset.

The present invention has been described herein as being applied to synchronizing wireless devices in a particular frequency band. However, it is to be understood that the invention may also be applicable to synchronizing wireless devices that operate in other frequency bands.

While this invention has been described as having an exemplary design, the present invention may be further modified within the spirit and scope of this disclosure. This application is therefore intended to cover any variations, uses, or adaptations of the invention using its general principles.

What is claimed is:

1. A method of synchronizing wireless devices, the method comprising the steps of:
    establishing a recurring sequence of frequency channels at which the wireless devices are to communicate;
    dividing the frequency channels into a plurality of groups;
    transmitting synchronization information at a respective first frequency channel in each of the groups of frequency channels during a first sampling time period;
    selecting one of the groups of frequency channels;
    using one of the wireless devices to sample each of the frequency channels in the selected group during the first sampling time period;
    transmitting non-synchronization information after the first sampling time period; and
    transmitting synchronization information at a next respective frequency channel in each of the groups of frequency channels during a next sampling time period, the next sampling time period occurring after the transmitting of the non-synchronization information.

2. The method of claim 1 comprising the further step of transmitting non-synchronization information after the next sampling time period.

3. The method of claim 2 wherein the steps of transmitting synchronization information at a next respective frequency channel and transmitting the non-synchronization information are repeated until synchronization information has been transmitted in each of the frequency channels in each of the groups of frequency channels.

4. The method of claim 3 wherein, after synchronization information has been transmitted in each of the frequency channels in each of the groups of frequency channels, the transmitting steps are repeated until synchronization information has again been transmitted in each of the frequency channels in each of the groups of frequency channels.

5. The method of claim 4, comprising the further steps of:
selecting an other one of the groups of frequency channels; and
using an other one of the wireless devices to sample each of the frequency channels in the selected other group during one of the sampling time periods.

6. The method of claim 1 wherein the frequency channels are in at least one of frequency bands 902 to 928 MHz and 2400 to 2483.4 MHz.

7. The method of claim 1 wherein the synchronization information comprises a time period and a frequency channel associated with transmission of non-synchronization information.

8. A method of synchronizing wireless devices, the method comprising the steps of:
establishing a recurring sequence of frequency channels at which the wireless devices are to communicate;
dividing the frequency channels into a plurality of groups;
transmitting synchronization information at a respective first frequency channel in each of the groups of frequency channels during a first sampling time period;
using a wireless device to select one of the groups of frequency channels;
using one of the wireless devices to sample each of the frequency channels in the selected group for the synchronization information, the sampling occurring during the first sampling time period;
transmitting non-synchronization information after the first sampling time period;
transmitting synchronization information at a next respective frequency channel in each of the groups of frequency channels during a next sampling time period, the next sampling time period occurring after the transmitting of the non-synchronization information;
transmitting non-synchronization information after the next sampling period; and
repeating the steps of transmitting synchronization information at a next respective frequency channel and transmitting the non-synchronization information until synchronization information has been transmitted in each of the frequency channels in each of the groups of frequency channels.

9. The method of claim 8 comprising the further step of adding a preamble to the synchronization information, a time duration of the preamble being approximately equal to an amount of time needed to sample each of the frequency channels in the selected group.

10. The method of claim 8 comprising the further step of informing each of the wireless devices of the recurring sequence of frequency channels at which the wireless devices are to communicate.

11. The method of claim 8 wherein, after synchronization information has been transmitted in each frequency channel in each of the groups of frequency channels, the transmitting steps are repeated until synchronization information has again been transmitted in each of the frequency channels in each of the groups of frequency channels.

12. The method of claim 11, comprising the further steps of:
selecting an other one of the groups of frequency channels; and
using an other wireless device to sample each of the frequency channels in the selected other group during one of the first sampling periods.

13. The method of claim 8 wherein the frequency channels are in at least one of frequency bands 902 to 928 MHz and 2400 to 2483.4 MHz.

14. The method of claim 8 wherein the synchronization information comprises a time period and a frequency channel associated with transmission of non-synchronization information.

15. A method of synchronizing wireless devices, the method comprising the steps of:
transmitting synchronization information at a respective first frequency channel in each of a plurality of groups of frequency channels, the transmitting occurring entirely during a first sampling time period, each of the groups including at least two of the frequency channels;
using a wireless device to select one of the groups of frequency channels;
using one of the wireless devices to sample each of the frequency channels in the selected group for the synchronization information, the sampling occurring entirely during the first sampling time period;
transmitting non-synchronization information after the first sampling time period;
transmitting synchronization information at a next respective frequency channel in each of the groups of frequency channels, the transmitting occurring entirely during a next sampling time period, the next sampling time period occurring after the transmitting of the non-synchronization information;
transmitting non-synchronization information after the next sampling period; and
repeating the steps of transmitting synchronization information at a next respective frequency channel and transmitting the non-synchronization information after the next sampling period until synchronization information has been transmitted in each of the frequency channels in each of the groups of frequency channels.

16. The method of claim 15 comprising the further step of adding a preamble to the synchronization information, a time duration of the preamble being equal to an amount of time needed to sample each of the frequency channels in the selected group.

17. The method of claim 15 comprising the further step of informing each of the wireless devices of a sequence of frequency channels at which the wireless devices are to communicate, the sequence of frequency channels being within the groups of frequency channels.

18. The method of claim 15 wherein, after synchronization information has been transmitted in each frequency channel in each of the groups of frequency channels, the transmitting steps are repeated until synchronization information has again been transmitted in each of the frequency channels in each of the groups of frequency channels, the method comprising the further steps of:
selecting an other one of the groups of frequency channels; and
using an other wireless device to sample each of the frequency channels in the selected other group during one of the first sampling periods.

19. The method of claim 15 wherein the frequency channels are in a first frequency band from 902 to 928 MHz and/or a second frequency band from 2400 to 2483.4 MHz.

20. The method of claim 15 wherein the synchronization information includes a time period and a frequency channel in which non-synchronization information is to be transmitted.

* * * * *